US012670752B2

(12) United States Patent (10) Patent No.: US 12,670,752 B2
Nakano (45) Date of Patent: Jun. 30, 2026

(54) MARINE VESSEL MANAGEMENT SYSTEM

(71) Applicant: YAMAHA HATSUDOKI KABUSHIKI KAISHA, Iwata (JP)

(72) Inventor: Sho Nakano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 141 days.

(21) Appl. No.: 18/098,817

(22) Filed: Jan. 19, 2023

(65) Prior Publication Data

US 2023/0237859 A1 Jul. 27, 2023

(30) Foreign Application Priority Data

Jan. 21, 2022 (JP) ................................. 2022-007725

(51) Int. Cl.
*G07C 5/08* (2006.01)
*B63B 79/10* (2020.01)
*B63B 79/30* (2020.01)
*G06Q 30/0645* (2023.01)
*G07C 5/00* (2006.01)
*G05D 1/00* (2006.01)

(52) U.S. Cl.
CPC ............ *G07C 5/0825* (2013.01); *B63B 79/10* (2020.01); *B63B 79/30* (2020.01); *G06Q 30/0645* (2013.01); *G07C 5/008* (2013.01); *G05D 1/0016* (2013.01)

(58) Field of Classification Search
CPC ...... G07C 5/0825; G07C 5/008; B63B 79/30; B63B 79/10; G06Q 30/0645; G05D 1/0016
See application file for complete search history.

(56) References Cited

U.S. PATENT DOCUMENTS

| | | | | |
|---|---|---|---|---|
| 11,074,558 B1 * | 7/2021 | Johnstone | .......... | G06Q 20/0855 |
| 2006/0158549 A1 * | 7/2006 | Digweed | ............... | H04N 23/50 |
| | | | | 348/E5.025 |
| 2009/0187297 A1 * | 7/2009 | Kish | .................. | G05B 23/0213 |
| | | | | 701/21 |
| 2009/0325131 A1 * | 12/2009 | Cernasov | ............... | G09B 9/307 |
| | | | | 434/30 |

(Continued)

FOREIGN PATENT DOCUMENTS

| | | | | |
|---|---|---|---|---|
| CN | 113761061 A | * 12/2021 | ............. | H04L 67/06 |
| JP | 2013-095245 A | 5/2013 | | |

(Continued)

OTHER PUBLICATIONS

English translation of CN 113761061 A (Year: 2021).*

(Continued)

*Primary Examiner* — Navid Z. Mehdizadeh
*Assistant Examiner* — Matthew Ho
(74) *Attorney, Agent, or Firm* — Keating & Bennett, LLP

(57) ABSTRACT

A marine vessel management system to reduce the burden on a marine vessel rental business operator includes a marine vessel, an information processor, and a portable terminal device operable by a marine vessel user. When the marine vessel is leaving a port and/or when the marine vessel is returning to the port, the portable terminal device receives information about a state of the marine vessel via the information processor, and displays the received information about the state of the marine vessel.

14 Claims, 7 Drawing Sheets

(56)  References Cited

U.S. PATENT DOCUMENTS

| | | | | |
|---|---|---|---|---|
| 2013/0213344 A1* | 8/2013 | Stender | ................. | B60J 1/2091 |
| | | | | 123/198 D |
| 2014/0156138 A1* | 6/2014 | Klaff | .................... | G06Q 10/02 |
| | | | | 705/5 |
| 2015/0287130 A1* | 10/2015 | Vercollone | .......... | G06V 10/235 |
| | | | | 705/34 |
| 2017/0262785 A1 | 9/2017 | Lee | | |
| 2018/0348007 A1 | 12/2018 | Adachi | | |
| 2019/0311553 A1 | 10/2019 | Kawase | | |
| 2019/0359239 A1 | 11/2019 | Subrahmaniyan et al. | | |
| 2020/0216018 A1 | 7/2020 | Takano et al. | | |
| 2022/0005141 A1 | 1/2022 | Ito | | |
| 2022/0207598 A1 | 6/2022 | Baba et al. | | |
| 2022/0234702 A1* | 7/2022 | Maddox | ................. | B63B 34/10 |

FOREIGN PATENT DOCUMENTS

| | | | |
|---|---|---|---|
| JP | 2019-185196 A | 10/2019 |
| KR | 10-2017-0104897 A | 9/2017 |
| KR | 10-2021-0096454 A | 8/2021 |
| WO | 2021/054080 A1 | 3/2021 |

OTHER PUBLICATIONS

Official Communication issued in corresponding European Patent Application No. 23150143.8, mailed on Jun. 21, 2023.
Yamaha Motor Co., Ltd., "Marine Club Sea Style", https://sea-style.yamaha-motor.co.jp/, retrieved on Jan. 12, 2022, 5 pages.

* cited by examiner

5

MARINE VESSEL MANAGEMENT SYSTEM

CROSS REFERENCE TO RELATED APPLICATIONS

This application claims the benefit of priority to Japanese Patent Application No. 2022-007725, filed on Jan. 21, 2022. The entire contents of this application are hereby incorporated herein by reference.

BACKGROUND OF THE INVENTION

1. Field of the Invention

The present invention relates to a marine vessel management system that manages a marine vessel used in a rental business.

2. Description of the Related Art

For the purpose of promoting the spread of marine leisure, Yamaha Motor Co., Ltd. is running a marine vessel rental business, for example, a pleasure boat rental business (for example, see "Marine Club Sea Style", [online], Yamaha Motor Co., Ltd., [searched on Jan. 12, 2022], Internet <URL: https://sea-style.yamaha-motor.co.jp/>). In this type of rental business, in principle, although a rental fee is charged according to the use time of a marine vessel, repair costs for damage to the hull of the marine vessel and power source failures (for example, engine failures) that occur while the marine vessel is being rented are also added to the rental fee. Therefore, in the marine vessel rental business, it is important to confirm the state of the marine vessel not only when leaving a port but also when returning to the port.

However, in order to confirm the state of the marine vessel when leaving the port or when returning to the port, it is necessary for a staff member of a rental business operator, for example, a staff member of a marina to visually confirm the state of the marine vessel. In addition, the staff member of the marina needs to not only put the result of the visual confirmation into a checklist on paper but also describe the state of the marine vessel to a marine vessel user who has borrowed the marine vessel. In other words, since the staff member of the rental business operator needs to directly deal with confirming the state of the marine vessel when leaving the port or when returning to the port, there is room for improvement in terms of reducing the burden on the rental business operator.

SUMMARY OF THE INVENTION

Preferred embodiments of the present invention provide marine vessel management systems that are each able to reduce the burden on a marine vessel rental business operator.

According to a preferred embodiment of the present invention, a marine vessel management system includes a marine vessel, an information processor, and a portable terminal device operable by a marine vessel user. When the marine vessel is leaving a port and/or when the marine vessel is returning to the port, the portable terminal device is operable to receive information about a state of the marine vessel via the information processor, and display the received information about the state of the marine vessel.

According to another preferred embodiment of the present invention, a marine vessel management system includes a marine vessel and a portable terminal device operable by a marine vessel user. When the marine vessel is leaving a port and/or when the marine vessel is returning to the port, the portable terminal device is operable to receive information about a state of the marine vessel from the marine vessel, and display the received information about the state of the marine vessel.

According to a preferred embodiment of the present invention, when the marine vessel is leaving the port and/or when the marine vessel is returning to the port, since the portable terminal device receives the information about the state of the marine vessel and displays the received information about the state of the marine vessel, the marine vessel user and the staff member of the marine vessel rental business operator are able to understand the state of the marine vessel by just confirming the portable terminal device. As a result, it is possible to eliminate the need for visual confirmation of the state of the marine vessel performed by the staff member of the marine vessel rental business operator, and it is possible to reduce the burden on the marine vessel rental business operator.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
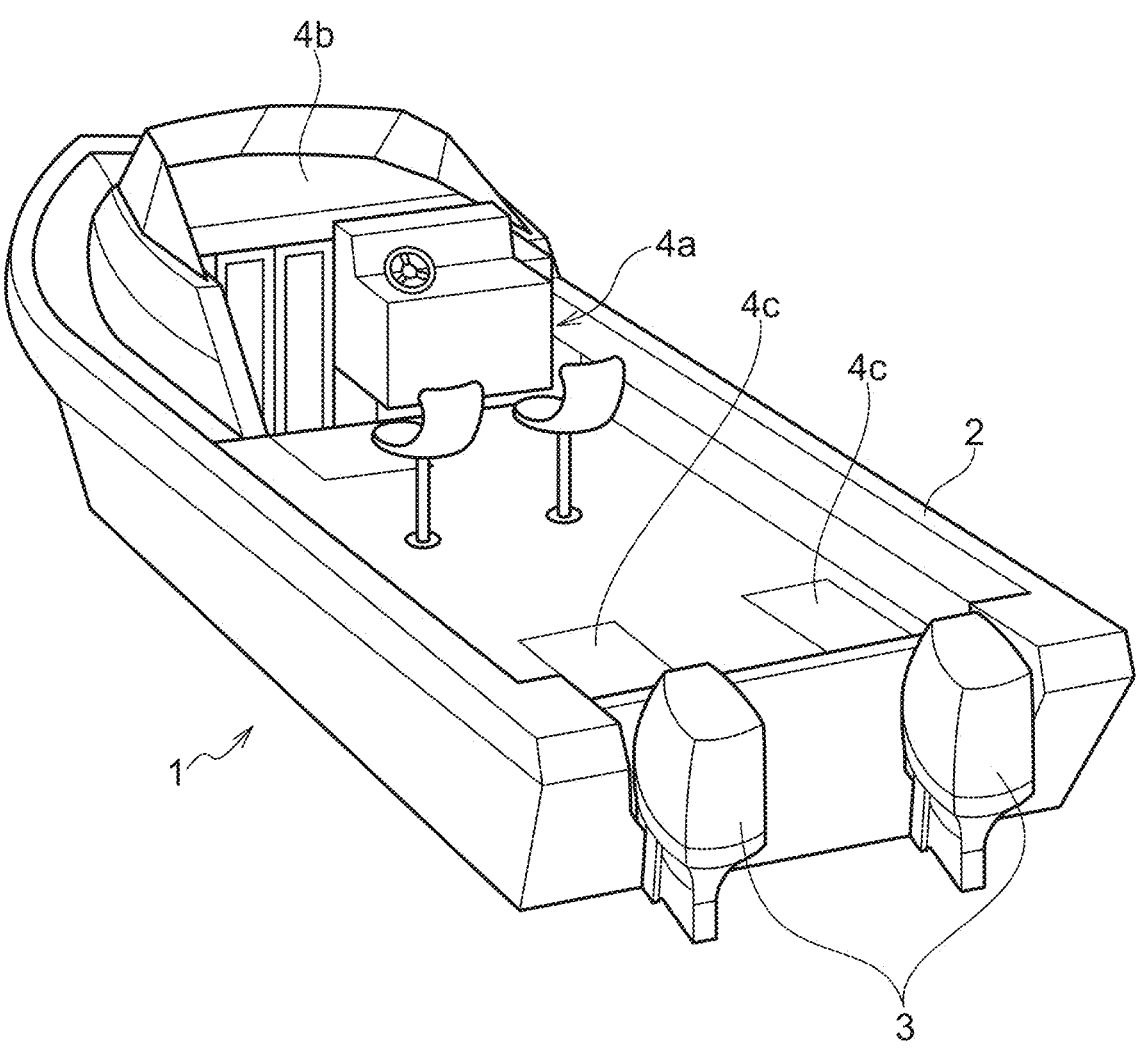
FIG. 1 is a perspective view of a marine vessel managed by a marine vessel management system according to a preferred embodiment of the present invention.

FIG. 1 is a perspective view of a marine vessel managed by a marine vessel management system according to a preferred embodiment of the present invention. A marine vessel 1 includes a hull 2, and a plurality of, for example, two outboard motors 3 that function as marine vessel propulsion devices and are mounted on the hull 2. It should be noted that the number of the outboard motors 3 provided on the marine vessel 1 is not limited to two, and may be one or three or more. The two outboard motors 3 are mounted side by side on the stern of the hull 2. Each outboard motor 3 includes an engine 23 (shown in FIG. 3) which may be an internal combustion engine functioning as a power source, and obtains a thrust from a propeller (not shown) which is rotated by a driving force of the corresponding engine 23. It should be noted that each outboard motor 3 may include an electric motor functioning as the power source, or may include both an engine and an electric motor functioning as the power source. In addition, in the marine vessel 1, a maneuvering seat 4a and a cabin 4b are provided on the bow side, which is the front portion of the hull 2, and storage spaces 4c, which are storage chambers, are provided on the middle portion of the hull 2 or the stern side that is the rear portion of the hull 2.

Figure 2:
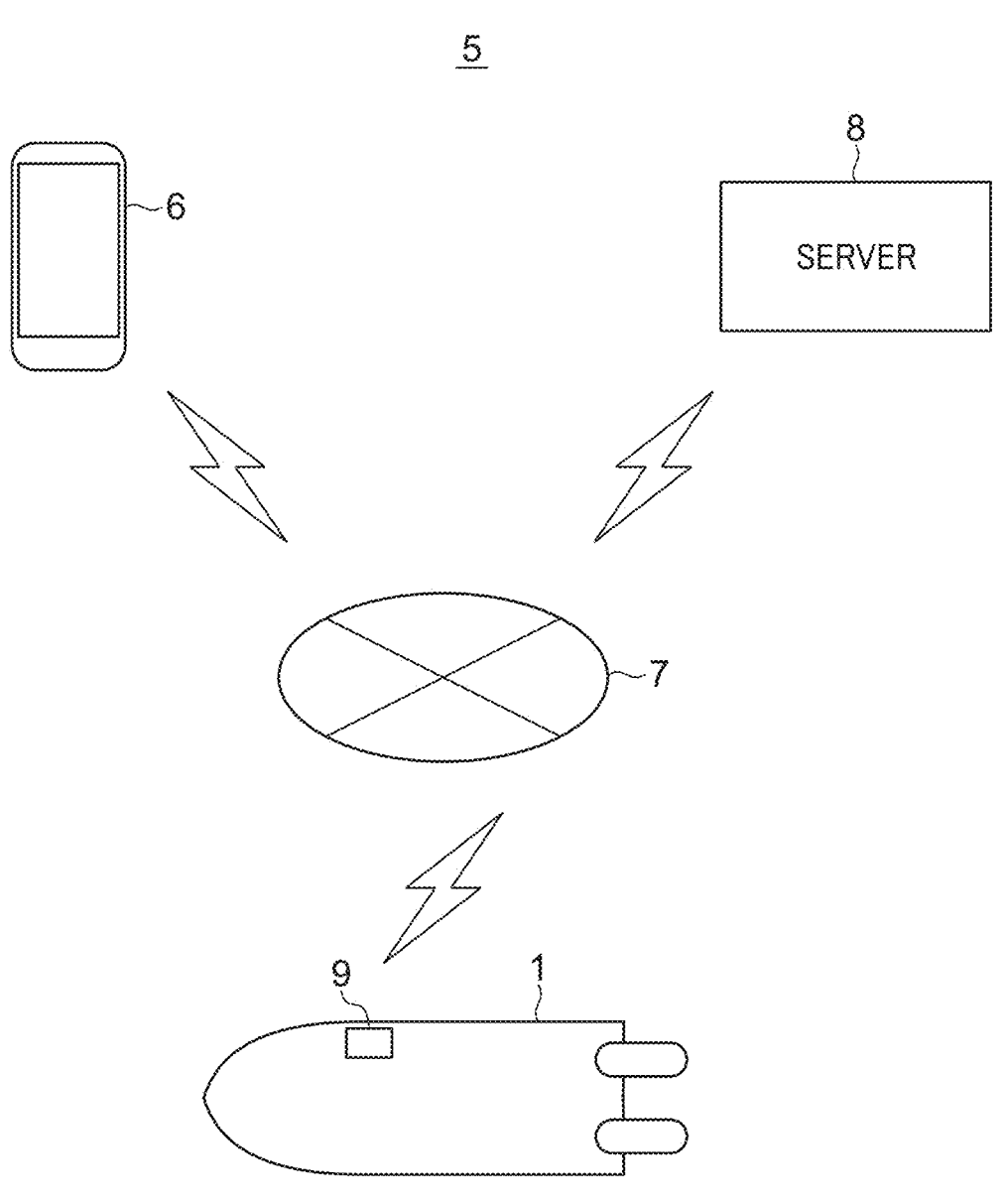
FIG. 2 is a diagram for explaining a configuration of the marine vessel management system according to a preferred embodiment of the present invention.

FIG. 2 is a diagram for explaining a configuration of the marine vessel management system according to a preferred embodiment of the present invention. As shown in FIG. 2, a marine vessel management system 5 includes the marine vessel 1, a portable terminal device (for example, a smartphone 6) possessed by a marine vessel user who borrows the marine vessel 1, a public communication network (for example, the Internet 7), and a server 8 functioning as an information processing apparatus (processor). In addition, the marine vessel 1 includes a cellular data communication module 9 (DCM: Data Communication Module) which is a communication terminal.

In a preferred embodiment of the present invention, a reservation management application for a marine vessel rental service is installed on the server 8, and an application for receiving provision of the marine vessel rental service (hereinafter, referred to as "a rental application") is installed on the smartphone 6. The marine vessel user inputs in advance the type of the marine vessel 1 to be borrowed and the date and time (a borrowing reservation time) on the reservation management application. In addition, the marine vessel user is able to perform a leaving port procedure on the reservation management application before borrowing the reserved marine vessel 1.

The DCM 9 is a module able to perform wireless communications conforming to a predetermined communication standard. For example, the DCM 9 is a module able to perform communications conforming to the "International Mobile Telecommunication (IMT)-2000" standard (the so-called 3G standard) defined by the International Telecommunication Union (ITU), communications conforming to the LTE (Long Term Evolution) standard, or communications conforming to the "IMT-Advanced" standard (the so-called 4G standard). It should be noted that the DCM 9 may be a communication module that performs communications conforming to a communication standard other than the communication standards described above. In addition, as with the DCM 9, the smartphone 6 and the server 8 also perform communications conforming to the 3G standard, communications conforming to the LTE standard, communications conforming to the 4G standard, or communications conforming to one of other communication standards. In a preferred embodiment of the present invention, the smartphone 6, the server 8, and the DCM 9 transmit/receive commands and data to/from each other via the Internet 7 by wireless communications conforming to one of the communication standards described above.

It should be noted that the portable terminal device operable by the marine vessel user is not limited to the smartphone 6, and may be any information terminal device that is portable and includes a display and an input unit that accepts inputs, for example, it may be a notebook-sized personal computer or a tablet personal computer.

Figure 3:
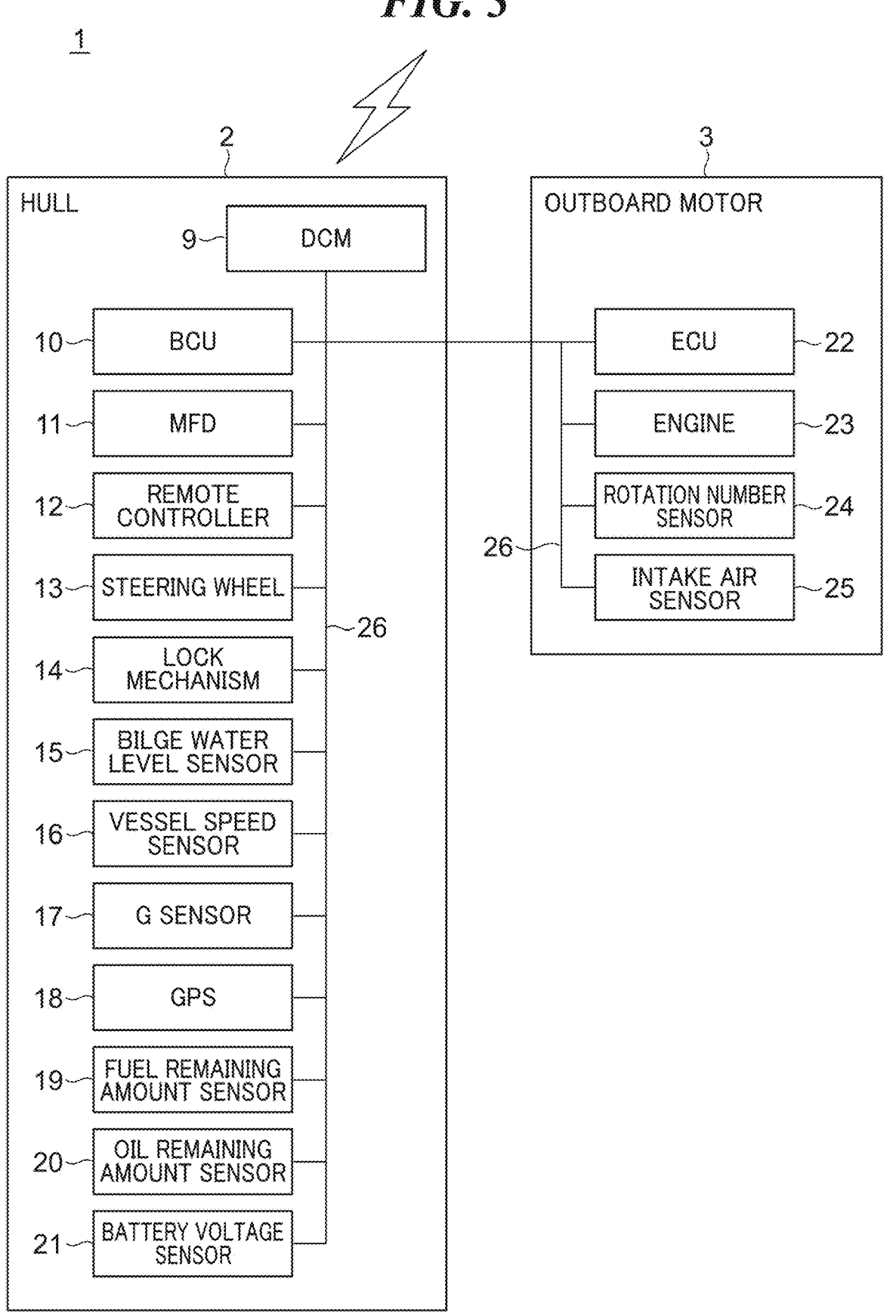
FIG. 3 is a block diagram that schematically shows respective components included in the marine vessel of FIG. 1.

FIG. 3 is a block diagram that schematically shows respective components included in the marine vessel 1. As shown in FIG. 3, the marine vessel 1 includes a boat control unit (BCU) 10, a multi-function display (MFD) 11, a remote controller 12, a steering wheel 13, a lock mechanism 14, a bilge water level sensor 15, a vessel speed sensor 16, a G sensor 17, a global positioning system (GPS) 18, a fuel remaining amount sensor 19, an oil remaining amount sensor 20, and a battery voltage sensor 21 that are provided on the hull 2, and further, each outboard motor 3 includes an engine control unit (ECU) 22, the engine 23, a rotation number sensor 24, and an intake air sensor 25.

The BCU 10 is a main controller of the marine vessel 1, and controls operations of the respective components of the marine vessel 1 according to various kinds of programs. The MED 11 functions as a display that displays various kinds of information, and also functions as a touch panel that accepts inputs from the marine vessel user. The remote controller 12 includes levers (not shown) corresponding to the outboard motors 3, respectively. By operating each lever, the marine vessel user is able to switch a direction of the thrust generated by the corresponding outboard motor 3 between a forward moving direction and a backward moving direction, and adjust the output of the corresponding outboard motor 3 so as to adjust a vessel speed of the marine vessel 1. The steering wheel 13 enables the marine vessel user to determine a course of the marine vessel 1. The marine vessel user is able to change the orientations of the respective outboard motors 3 that function as a rudder of the marine vessel 1 so as to change an acting direction of the thrust by rotatably operating the steering wheel 13 to the left or right, and thus, it is possible for the marine vessel user to change the course of the marine vessel 1 leftward or rightward.

The lock mechanism 14 unlocks or locks the cabin 4b and/or the storage spaces 4c of the marine vessel 1. The bilge water level sensor 15 measures the amount of water (bilge) accumulated in the bottom of the hull 2. The vessel speed sensor 16 measures the vessel speed of the marine vessel 1. The G sensor 17 measures a gravitational acceleration acting on the hull 2. The GPS 18 measures the position of the marine vessel 1 in the earth coordinate system. The fuel remaining amount sensor 19 measures the amount of fuel remaining in a fuel tank (not shown) provided on the hull 2. The oil remaining amount sensor 20 measures the amount of engine oil remaining in an engine oil tank (not shown) provided on the outboard motor 3. The battery voltage sensor 21 measures a voltage of a battery (not shown) provided on the hull 2.

The ECU 22 is a controller for the engine 23 and controls the engine 23 according to control signals issued by the BCU 10. The rotation number sensor 24 measures a rotation number of the engine 23. The intake air sensor 25 measures an intake air amount of the engine 23.

In the marine vessel 1, the respective components 9 to 25 described above are connected to each other by a control area network (CAN) 26 that is a network in which a plurality of nodes are individually connected to a bus. In the CAN 26, the measurement results of the components 15 to 21, 24, and 25 are transmitted to the BCU 10. Also, the BCU 10 transmits the transmitted measurement results to the server 8 via the Internet 7 by the DCM 9. It should be noted that the respective components of the marine vessel 1 may be connected to each other not by the CAN but by a local area network (LAN) such as Ethernet (registered trademark) that provides connections via a network device, or the respective components may be directly connected to each other.

Figure 4:
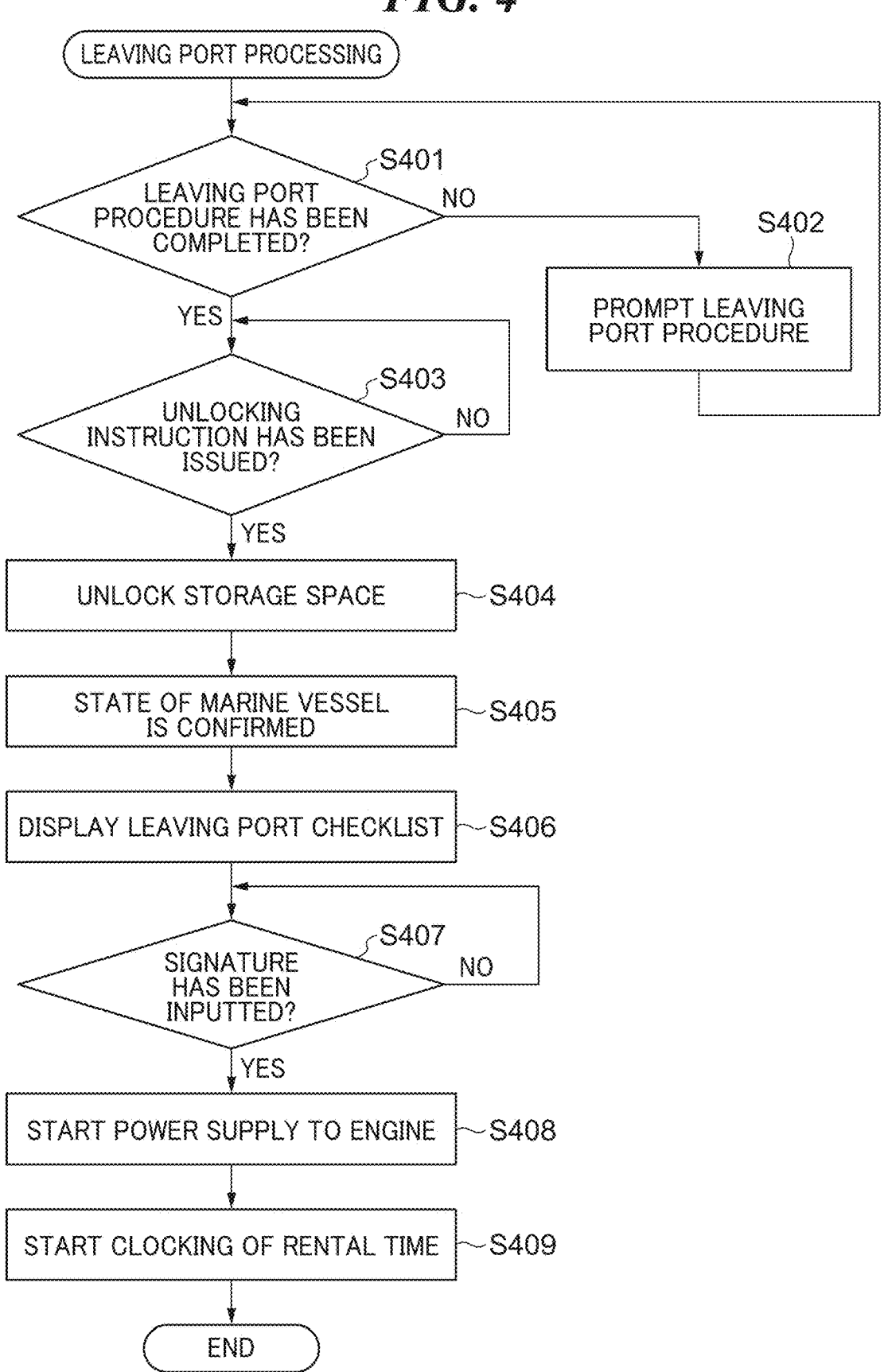
FIG. 4 is a flowchart that shows a leaving port process executed by the marine vessel management system according to a preferred embodiment of the present invention.

FIG. 4 is a flowchart that shows a leaving port process executed by the marine vessel management system according to a preferred embodiment of the present invention. The leaving port process is executed in the marine vessel management system 5 when the marine vessel user borrows the marine vessel 1 from a marina operator that is a rental business operator of the marine vessel 1. In addition, the execution of the leaving port process is started at a predetermined time before the borrowing reservation time of the marine vessel 1, for example, one hour before the borrowing reservation time.

As shown in FIG. 4, first, the server 8 determines whether or not the leaving port procedure performed by the marine vessel user on the reservation management application or in the marina reception has been completed (a step S401). In the case that the leaving port procedure has not been completed, the server 8 causes the smartphone 6 to display or pronounce a message that prompts the leaving port procedure (a step S402), and then the leaving port process returns to the step S401. On the other hand, in the case that the leaving port procedure has been completed, the server 8 transmits a code functioning as a smart key to the smartphone 6, and further determines whether or not an unlocking instruction to unlock the cabin 4b and/or the storage spaces 4c using the smart key on the rental application of the smartphone 6 has been issued (a step S403).

Moreover, in the leaving port process, although when the leaving port procedure has been completed, the smart key is transmitted to the smartphone 6 and the unlocking instruction is able to be issued. The condition for transmitting the smart key to the smartphone 6 is not limited to the completion of the leaving port procedure, and may be the satisfaction of leaving port conditions (conditions related to a wind speed and the climate), or may be that the marine vessel user has approached the marine vessel 1 within a predetermined distance, for example, within 10 meters.

As a result of the determination in the step S403, in the case that the unlocking instruction has not been issued, the leaving port process returns to the step S403, and waiting for the unlock instruction to be inputted. On the other hand, in the case that the unlocking instruction has been issued, a command to instruct unlocking of the cabin 4b and/or the storage spaces 4c is transmitted from the server 8 to the BCU 10, and upon receiving the command to instruct unlocking of the cabin 4b and/or the storage spaces 4c, the BCU 10 unlocks the cabin 4b and/or the storage spaces 4c by using the lock mechanism 14 (a step S404).

Next, when at least one of the cabin 4b and the storage spaces 4c is unlocked, a state of the marine vessel 1 is confirmed (a step S405). Specifically, a command to instruct the transmission of the measurement results of the components 15 to 21 and an abnormality history of the engine 23 stored by the ECU 22 (hereinafter, referred to as "leaving port measurement results") is transmitted from the server 8 to the DCM 9, and upon receiving the command to instruct the transmission of the leaving port measurement results (information about the state of the marine vessel), the DCM 9 collects the leaving port measurement results and transmits them to the server 8. It should be noted that the BCU 10 and the ECU 22 may collect the leaving port measurement results and may transmit the collected leaving port measurement results to the server 8 via the DCM 9. Furthermore, the server 8 stores the transmitted leaving port measurement results and transmits them to the smartphone 6. In addition, at this time, if the server 8 stores an image obtained by photographing a damaged part on the marine vessel 1 (hereinafter, referred to as "a damaged image"), the server 8 will also transmit the damaged image to the smartphone 6.

Next, based on the transmitted leaving port measurement results, the smartphone 6 displays a leaving port checklist 27, which indicates the state of the marine vessel 1, on the rental application (a step S406).

Figure 5:
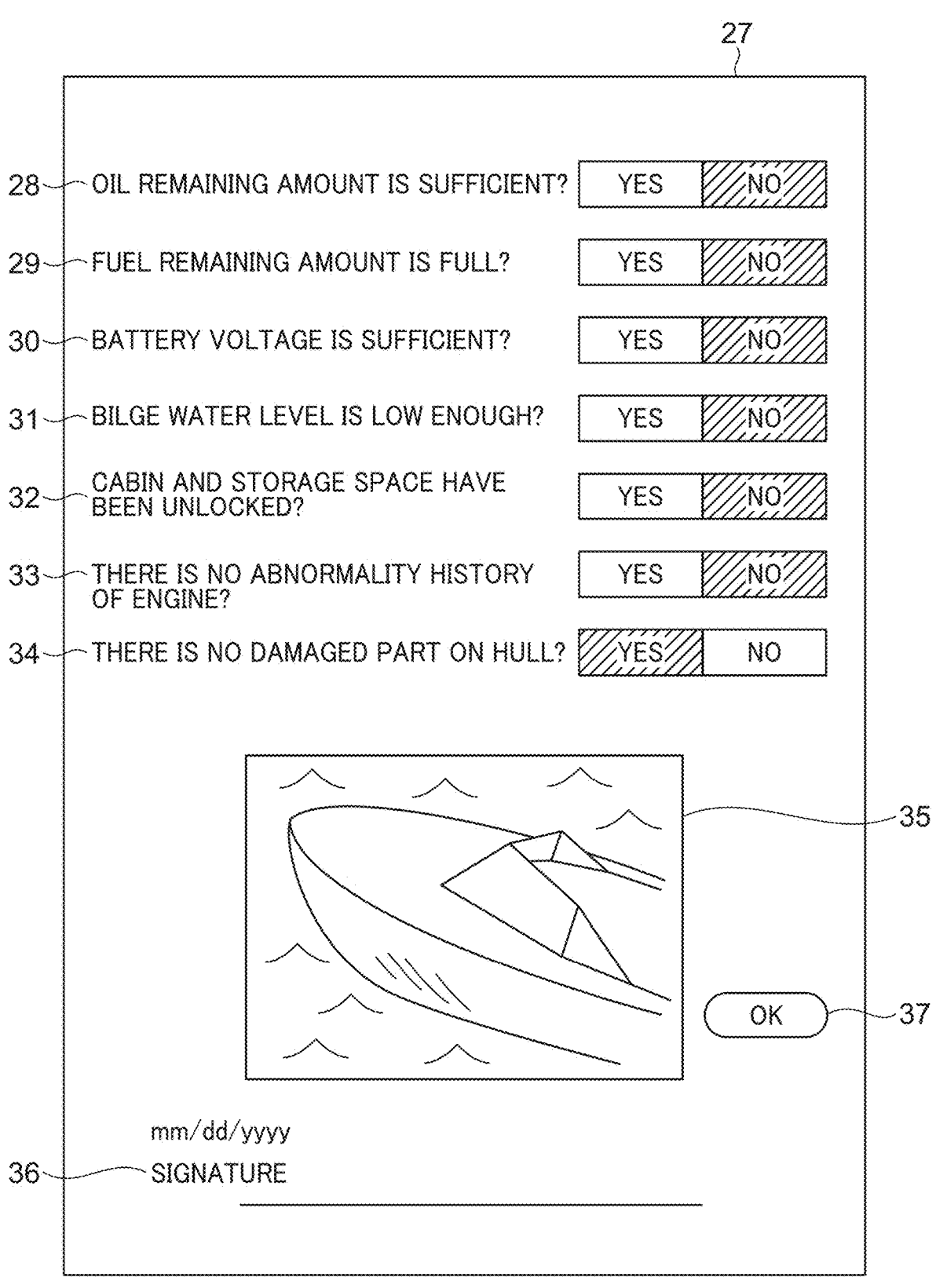
FIG. 5 is a diagram that shows an example of a leaving port checklist displayed on a smartphone when the marine vessel of FIG. 1 is leaving a port.

FIG. 5 is a diagram that shows an example of the leaving port checklist 27 displayed on the smartphone 6 when the marine vessel 1 is leaving a port. As shown in FIG. 5, the leaving port checklist 27 includes an item 28 indicating whether or not the remaining amount of the engine oil is sufficient, an item 29 indicating whether or not the remaining amount of the fuel is full, an item 30 indicating whether or not the voltage of the battery is sufficient, an item 31 indicating whether or not the water level of the bilge is low enough, an item 32 indicating whether or not the cabin 4b and/or the storage spaces 4c have/has been unlocked, an item 33 indicating whether or not there is no abnormality history of the engine 23, and an item 34 indicating whether or not there is no damaged part on the hull 2. It should be noted that the leaving port checklist 27 does not need to include all of the items 28 to 34, and may include at least one of the items 28 to 34.

Each of the items 28 to 34 is provided with a YES/NO field indicating whether or not the corresponding item is satisfied. In the case that the corresponding item is satisfied, "NO" in the YES/NO field is displayed with shading, and on the other hand, in the case that the corresponding item is not satisfied, "YES" in the YES/NO field is displayed with shading. In addition, in the case that there is a damaged part on the hull 2, not only "YES" in the YES/NO field of the item 34 is displayed with shading, but also the damaged image transmitted from the server 8 is displayed on a damaged part display frame 35. Further, the leaving port checklist 27 includes a signature field 36 (a confirmation field) into which a signature of the marine vessel user is able to be inputted by using a stylus or the like.

In the leaving port checklist 27, in the case that even one of the items 28 to 34 is not satisfied, the signature field 36 is set to a non-inputtable state, and on the other hand, in the case that all of the items 28 to 34 are satisfied (in the case that "NO" in the YES/NO fields of all of the items 28 to 34 are displayed with shading), the signature field 36 is set to an inputtable state. However, in the case that only the item 34 indicating whether or not there is no damaged part on the hull 2 is not satisfied, when the marine vessel user who confirms the damaged image displayed on the damaged part display frame 35 and determines that the damaged part shown in the damaged image does not interfere with the navigation of the marine vessel 1 touches an OK button 37, the signature field 36 is set to the inputtable state.

Next, returning to FIG. 4, the server 8 determines whether or not the signature has been inputted into the signature field 36 of the leaving port checklist 27 (a step S407). In the case that the signature has not been inputted into the signature field 36, the leaving port process returns to the step S407. On the other hand, in the case that the signature has been inputted into the signature field 36, a command to instruct start power supply to the engine 23 (unlocking of the engine 23) and start clocking of a rental time is transmitted from the server 8 to the BCU 10. Upon receiving the command to instruct start power supply to the engine 23 and start clocking of the rental time, the BCU 10 transmits a command, which instructs start power supply to the engine 23, to the ECU 22, and the ECU 22 starts power supply to the engine 23 (a step S408). As a result, the engine 23 is able to be started. Further, the BCU 10 starts clocking of the rental time by using, for example, an internal clock (a step S409), and then ends the leaving port process.

Figure 6:
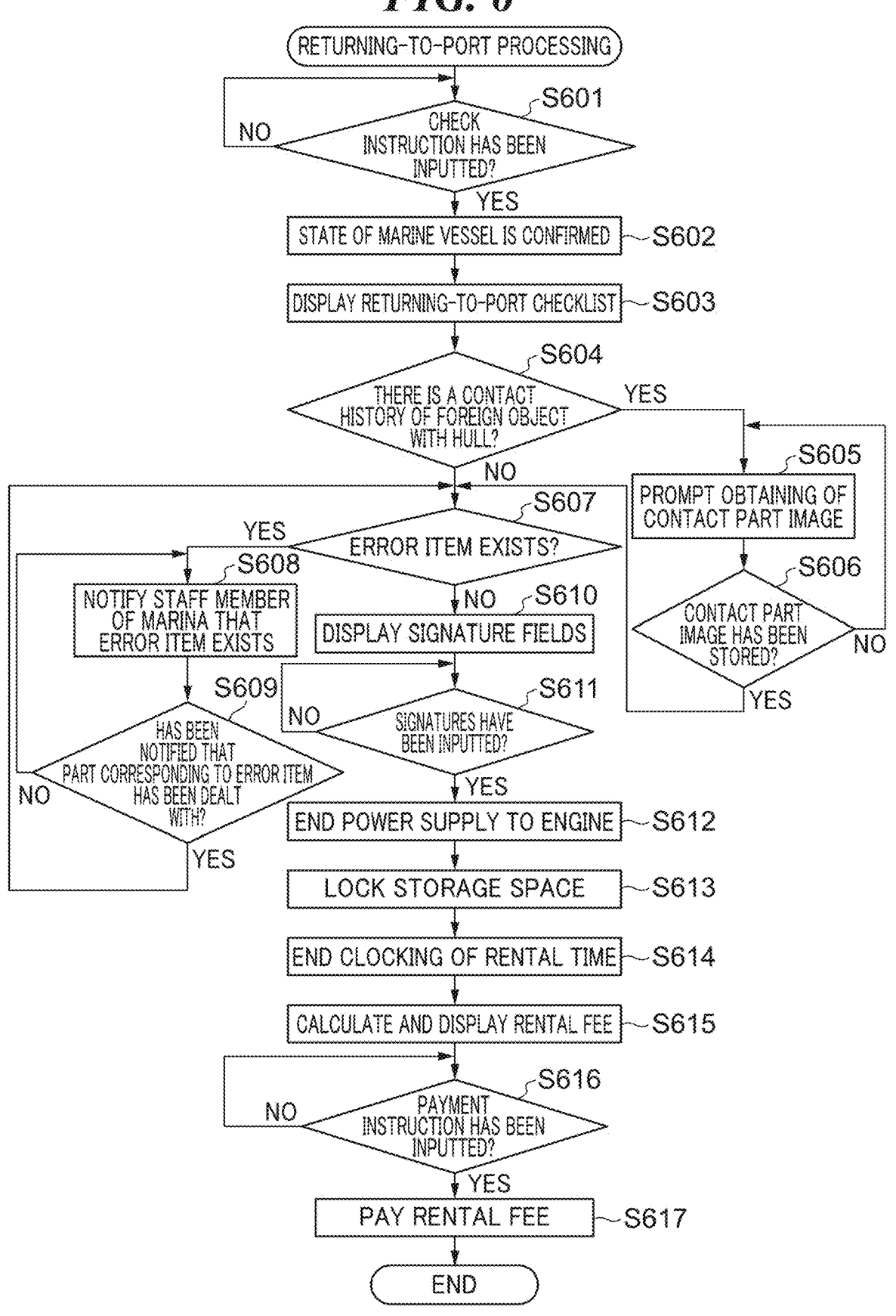
FIG. 6 is a flowchart that shows a returning-to-port process executed by the marine vessel management system according to a preferred embodiment of the present invention.

FIG. 6 is a flowchart that shows a returning-to-port process executed by the marine vessel management system according to a preferred embodiment of the present invention. The returning-to-port process is executed in the marine vessel management system 5 when the marine vessel 1 returns to the marina and the marine vessel user returns the marine vessel 1 to the marina operator.

As shown in FIG. 6, first, the server 8 determines whether or not a check instruction to perform the confirmation of the state of the marine vessel 1 has been inputted on the rental application of the smartphone 6 (a step S601). In the case that the check instruction has not been inputted, the returning-to-port process returns to the step S601, and on the other hand, in the case that the check instruction has been inputted, a command to instruct the transmission of the measurement results of the components 15 to 21, and the abnormality history such as overheating of the engine 23, a history of the intake air amount of the engine 23, and a history of the rotation number of the engine 23 that are stored by the ECU 22 (hereinafter, referred to as "returning-to-port measurement results") is transmitted from the server 8 to the DCM 9. Upon receiving the command to instruct the transmission of the returning-to-port measurement results (information about the state of the marine vessel), the DCM 9 collects the returning-to-port measurement results and transmits them to the server 8. It should be noted that the BCU 10 and the ECU 22 may collect the returning-to-port measurement results and may transmit the collected returning-to-port measurement results to the server 8 via the DCM 9. Furthermore, the server 8 stores the transmitted returning-to-port measurement results and transmits them to the smartphone 6. As a result, the state of the marine vessel 1 is confirmed and stored (a step S602).

Next, based on the transmitted returning-to-port measurement results, the smartphone 6 displays a returning-to-port checklist 38, which indicates the state of the marine vessel 1, on the rental application (a step S603).

Figure 7:
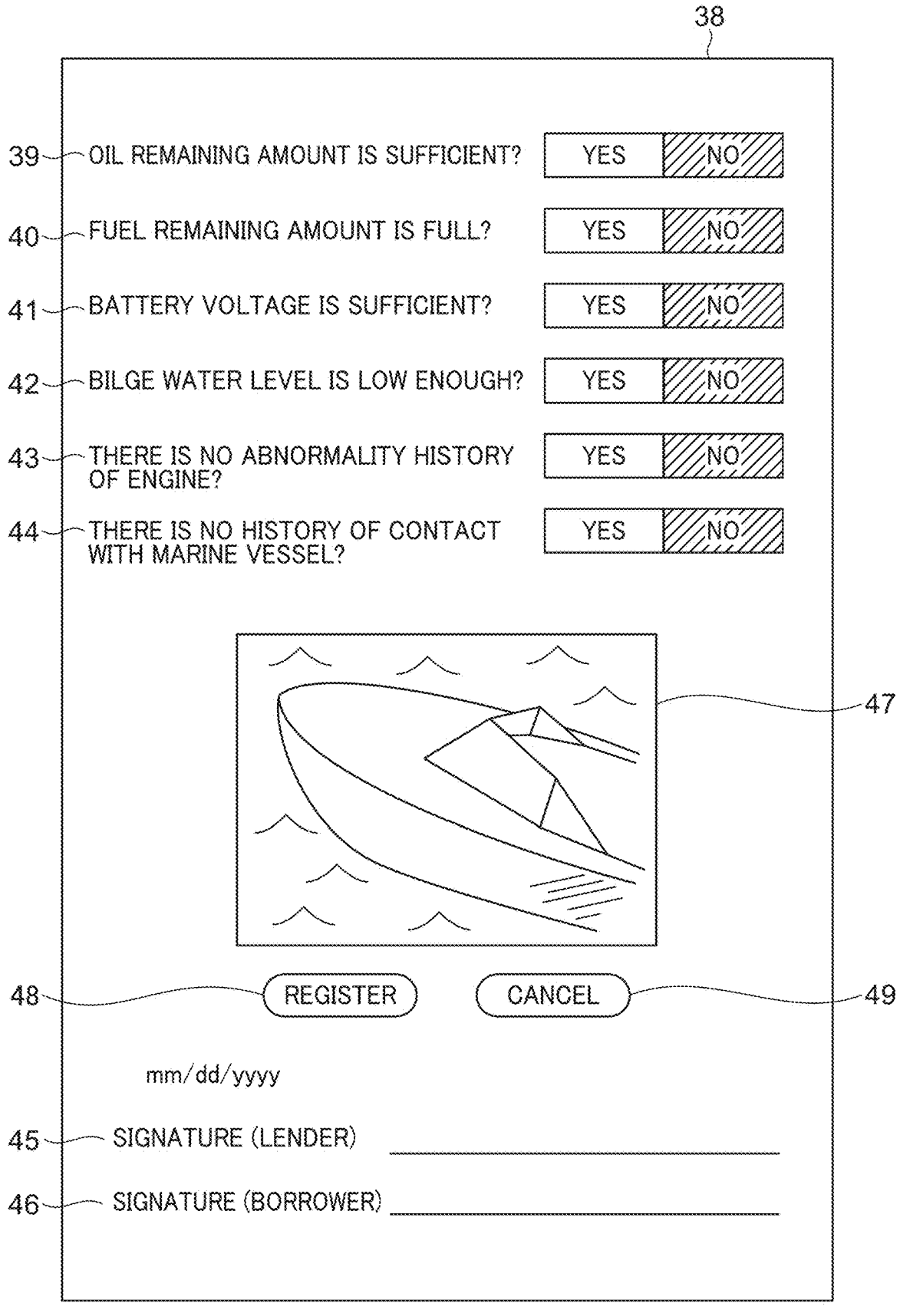
FIG. 7 is a diagram that shows an example of a returning-to-port checklist displayed on the smartphone when the marine vessel of FIG. 1 is returning to the port.

FIG. 7 is a diagram that shows an example of the returning-to-port checklist 38 displayed on the smartphone 6 when the marine vessel 1 is returning to the port. As shown in FIG. 7, the returning-to-port checklist 38 includes an item 39 indicating whether or not the remaining amount of the engine oil is sufficient, an item 40 indicating whether or not the remaining amount of the fuel is full, an item 41 indicating whether or not the voltage of the battery is sufficient, an item 42 indicating whether or not the water level of the bilge is low enough, an item 43 indicating whether or not there is no abnormality history of the engine 23, and an item 44 indicating whether or not there is no contact history of the marine vessel 1. It should be noted that the returning-to-port checklist 38 does not need to include all of the items 39 to 44, and may include at one or more of the items 39 to 44.

Further, as with the leaving port checklist 27, each of the items 39 to 44 is provided with a YES/NO field indicating whether or not the corresponding item is satisfied. Furthermore, the returning-to-port checklist 38 includes a lender's signature field 45 (a confirmation field) into which a signature of a staff member of the marina is able to be inputted by using a stylus or the like, and a borrower's signature field 46 (a confirmation field) into which a signature of the marine vessel user is able to be inputted by using a stylus or the like.

In the marine vessel management system 5, based on the returning-to-port measurement results, the server 8 determines whether or not there is a contact history (e.g., damage) of the marine vessel 1, and determines contacted parts where foreign objects contacted the marine vessel 1. For example, in the case that a history of the gravitational acceleration acting on the hull 2 measured by the G sensor 17 includes an abnormal value such as a rapid decrease or a rapid increase, since it is conceivable that a foreign object has come into contact with the hull 2 and a sudden change in speed has occurred, it is determined that a foreign object has come into contact with the hull 2. In addition, in the case that at least one of the history of the rotation number of the engine 23 measured by the rotation number sensor 24 and the history of the intake air amount of the engine 23 measured by the intake air sensor 25 includes an abnormal value such as a rapid decrease or a rapid increase, since it is conceivable that a foreign object has come into contact with the propeller and an abnormal rotation of the engine has occurred, it is determined that a foreign object has come into contact with the propeller. Furthermore, in the case that the navigation trajectory of the marine vessel 1 measured by the GPS 18 includes a sudden course change, since it is conceivable that a foreign object has come into contact with the outboard motor 3 and the orientation of the outboard motor 3 has changed and the sudden course change has occurred, it is determined that a foreign object has come into contact with the outboard motor 3.

Subsequently to the display of the returning-to-port checklist 38, it is determined whether or not there is a contact history of the foreign object with the hull 2 (a step S604). In the case that there is the contact history of a foreign object with the hull 2, by displaying a damaged part display frame 47 on the returning-to-port checklist 38, the smartphone 6 prompts obtaining of an image of a contact part with the foreign object on the hull 2 (hereinafter, referred to as "a contact part image") by photographing the hull 2 (a step S605). In addition to the display of the damaged part display frame 47, the server 8 may cause the smartphone 6 to display or pronounce a message that prompts obtaining the contact part image.

Next, the server 8 determines whether or not the contact part image has been stored (a step S606). The storage of the contact part image in the server 8 is performed by touching a register button 48 after the marine vessel user or the staff member of the marina obtains the contact part image by using a camera provided in the smartphone 6, or the like. It should be noted that when a cancel button 49 is touched after the contact part image is obtained, the contact part image is not stored in the server 8.

In the case of it being determined in the step S606 that the contact part image has not been stored, the returning-to-port process returns to the step S605, and on the other hand, in the case of it being determined in the step S606 that the contact part image has been stored, the returning-to-port process proceeds to a step S607.

In the step S607, it is determined whether or not the items that are not satisfied (hereinafter, referred to as "error items") exist in the items 39 to 43 other than the item 44 indicating whether or not there is no contact history of the marine vessel 1. In the case that even at least one error item exists in the items 39 to 43 (in the case that "YES" in the YES/NO field of at least one of the items 39 to 43 is displayed with shading), the server 8 notifies the staff member of the marina by a communication device such as a tablet personal computer that the error item exists (a step S608). Here, the staff member of the marina who has received the notification confirms the equipment corresponding to the error item on the marine vessel 1, takes measures to addressed the equipment corresponding to the error item as necessary (remedies or fixes the equipment corresponding to the error item as necessary), and then notifies the server 8 by a tablet personal computer or the like that the measures have been taken (the equipment corresponding to the error item has been remedied or fixed).

In a step S609 following the step S608, the server 8 determines whether or not it has been notified that the equipment corresponding to the error item has been addressed (the step S609). In the case that it has not been notified that the equipment corresponding to the error item has been addressed, the returning-to-port process returns to the step S609, and waits for the equipment corresponding to the error item to be addressed. On the other hand, in the case that it has been notified that the equipment corresponding to the error item has been addressed, the returning-to-port process returns to the step S607.

In the step S607, in the case that no error item exists in the items 39 to 43, the returning-to-port process proceeds to a step S610, and both the lender's signature field 45 and the borrower's signature field 46 are set to the inputtable state. Moreover, in the case that the lender's signature field 45 and the borrower's signature field 46 are not displayed by default and no error item exists in the items 39 to 43, the lender's signature field 45 and the borrower's signature field 46 may be displayed from the beginning.

Next, the server 8 determines whether or not the signatures have been inputted into both the lender's signature field 45 and the borrower's signature field 46 of the returning-to-port checklist 38 (a step S611). In the case that the signature has not been inputted into at least one of the lender's signature field 45 and the borrower's signature field 46, the returning-to-port process returns to the step S611. On the other hand, in the case that the signatures have been inputted into both the lender's signature field 45 and the borrower's signature field 46, a command to instruct end power supply to the engine 23 (locking of the engine 23), locking of the cabin 4b and/or the storage spaces 4c, and ending clocking of the rental time is transmitted from the server 8 to the BCU 10.

Upon receiving the command to instruct ending power supply to the engine 23, locking of the cabin 4b and/or the storage spaces 4c, and ending clocking of the rental time, the BCU 10 transmits a command, which instructs ending power supply to the engine 23, to the ECU 22, and the ECU 22 ends power supply to the engine 23 (a step S612). Further, the BCU 10 locks the cabin 4b and/or the storage spaces 4c by using the lock mechanism 14 (a step S613), and then ends clocking of the rental time (a step S614). Moreover, even in the case that the signatures have been inputted into both the lender's signature field 45 and the borrower's signature field 46, it is not necessary to perform all of ending power supply to the engine 23, locking of the cabin 4b, and locking of the storage spaces 4c, and at least one of ending power supply to the engine 23, locking of the cabin 4b, and locking of the storage spaces 4c need only be performed.

Next, based on the rental time that has been clocked, the consumption of the fuel, and the consumption of the engine oil, and in the case that the contact history of the marine vessel 1 exists, further based on an estimate, etc. of repair costs for damage to the hull 2, etc. due to the contact history of the marine vessel 1, the server 8 calculates a rental fee and transmits the calculated rental fee to the smartphone 6. The smartphone 6 displays the transmitted rental fee on the rental application (a step S615).

After that, the server 8 determines whether or not a payment instruction has been inputted on the rental application by the marine vessel user (a step S616). In the case that the payment instruction has not been inputted, the returning-to-port process returns to the step S616, and on the other hand, in the case that the payment instruction has been inputted, the rental fee is paid by a predetermined method, for example, by credit card (a step S617), and the returning-to-port process ends.

Moreover, in the returning-to-port process of FIG. 6, in the case that there is the contact history of the foreign object with the hull 2, if the contact part image is not obtained, the returning-to-port process will not proceed. Thus, the confirmation of the contact part of the hull 2 is set to be performed at a later date, the staff member of the marina and the marine vessel user are reminded that there is the contact history of the marine vessel 1 on the returning-to-port checklist 38, and the returning-to-port process may proceed even if the contact part image is not obtained. Specifically, the steps S604 to S606 may be removed from the returning-to-port processing of FIG. 6.

Furthermore, in the returning-to-port process of FIG. 6, in the case that the error item exists in the items 39 to 43, if the equipment corresponding to the error item is not addressed, the returning-to-port process will not proceed. Thus, dealing with the equipment corresponding to the error item is set to be performed at a later date, the staff member of the marina and the marine vessel user are reminded that the error item is displayed on the returning-to-port checklist 38, and the returning-to-port process may proceed even if the equipment corresponding to the error item is not addressed. Specifically, the steps S607 to S609 may be removed from the returning-to-port process of FIG. 6. Furthermore, the calculation and payment of the rental fee is set to be performed at a later date, and when the clocking of the rental time ends in the step S614, the returning-to-port process of FIG. 6 may end.

According to a preferred embodiment of the present invention, when the marine vessel 1 is leaving the port, and when the marine vessel 1 is returning to the port, the smartphone 6 receives the leaving port measurement results and the returning-to-port measurement results as the information about the state of the marine vessel 1 from the BCU 10 of the marine vessel 1. Further, based on the received leaving port measurement results and the received returning-to-port measurement results, the smartphone 6 displays the leaving port checklist 27 and the returning-to-port checklist 38 on the rental application. Therefore, the marine vessel user and the staff member of the marina are able to understand the state of the marine vessel 1 by just confirming the smartphone 6. As a result, it is possible to eliminate the need for visual confirmation of the state of the marine vessel 1 performed by the staff member of the rental business operator of the marine vessel 1, and it is possible to reduce the burden on the rental business operator.

In addition, since it is possible to reduce the burden on the rental business operator, it is possible for the rental business operator to save labor costs, and since the marine vessel user also does not need to perform visual confirmation in order to confirm the state of the marine vessel 1, it is also possible to reduce the burden on the marine vessel user.

Moreover, in a preferred embodiment of the present invention, since the leaving port measurement results and the returning-to-port measurement results are obtained by measuring by the components 15 to 21, it is possible to eliminate the need to land the marine vessel 1 in order to understand the state of the marine vessel 1. In this respect as well, it is possible to reduce the burden on the rental business operator. In addition, since the server 8 stores the leaving port measurement results and the returning-to-port measurement results, it is possible to simplify the management of the state of the marine vessel 1.

Although preferred embodiments of the present invention have been described above, the present invention is not limited to the above-described preferred embodiments, and various modifications and changes can be made within the scope of the gist thereof.

For example, in a preferred embodiment of the present invention, although both when the marine vessel 1 is leaving the port and when the marine vessel 1 is returning to the port, the checklists (the leaving port checklist 27 and the returning-to-port checklist 38) are displayed on the smartphone 6, a checklist on paper may be created in the conventional manner when the marine vessel 1 is leaving the port, and the returning-to-port checklist 38 may be displayed on the smartphone 6 only when the marine vessel 1 is returning to the port. Alternatively, a checklist on paper may be created in the conventional manner when the marine vessel 1 is returning to the port, and the leaving port checklist 27 may be displayed on the smartphone 6 only when the marine vessel 1 is leaving the port.

Furthermore, in a preferred embodiment of the present invention, although the server 8 executes the reservation management application and transmits the code functioning as the smart key to the smartphone 6, a server that executes the reservation management application and a server that transmits the code functioning as the smart key to the smartphone 6 may be provided instead of the server 8. As a result, it is possible to improve the security level. Also, the smartphone 6 may be a smartphone that the marina lends to the marine vessel user.

Although the leaving port checklist 27 and the returning-to-port checklist 38 are displayed in response to the transmission of the leaving port measurement results and the returning-to-port measurement results to the smartphone 6, a QR code (registered trademark) corresponding to the leaving port measurement results and a QR code corresponding to the returning-to-port measurement results may be displayed on the MFD 11, and the leaving port checklist 27 and the returning-to-port checklist 38 may be displayed on the smartphone 6 in response to the marine vessel user reading the QR code corresponding to the leaving port measurement results and the QR code corresponding to the returning-to-port measurement results with the smartphone 6.

Furthermore, in the marine vessel management system 5, although the DCM 9 of the marine vessel 1 and the smartphone 6 communicate with each other via the server 8 and the Internet 7, the DCM 9 and the smartphone 6 may communicate directly with each other. In this case, the DCM 9 and the smartphone 6 communicate with each other by short-range wireless communication such as Wi-Fi or Bluetooth (registered trademark), and the smartphone 6 executes the leaving port process of FIG. 4 and the returning-to-port process of FIG. 6.

Moreover, although the returning-to-port checklist 38 includes the lender's signature field 45 and the borrower's signature field 46, the lender's signature field 45 may be configured to be displayed only in the case that there is the contact history of the foreign object with the hull 2 and to need the staff member's input.

Furthermore, in a preferred embodiment of the present invention, although the returning-to-port checklist 38 needs the input of the signatures of both the staff member of the marina and the marine vessel user, the returning-to-port checklist 38 may only need the input of the signature of the marine vessel user.

Further, although the marine vessel 1 in the marine vessel management system 5 includes the outboard motors 3, there is no limitation on the type of the marine vessel in the marine vessel management system 5, and the marine vessel in the marine vessel management system 5 may be a marine vessel equipped with inboard/outboard motors or inboard motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel management system comprising:
   a marine vessel;
   an information processor; and
   a portable terminal device configured to be operated by a marine vessel user who rents and pilots the marine vessel; wherein
   when the marine vessel is leaving a port upon completing a leaving port procedure and when the marine vessel is returning to the port upon completing a check instruction regarding a state of the marine vessel, the portable terminal device operated by the marine vessel user is configured to receive information about the state of the marine vessel via the information processor, and display the received information about the state of the marine vessel;
   upon completing the leaving port procedure, the information processor is configured or programmed to unlock the marine vessel;
   the information processor is configured or programmed to determine a presence/absence of a contact of a foreign object with the marine vessel; and
   when the marine vessel is returning to the port, the information about the state of the marine vessel is displayed as a returning-to-port checklist, and the returning-to-port checklist includes at least the presence/absence of the contact of the foreign object with the marine vessel.

2. The marine vessel management system according to claim 1, wherein
   the portable terminal device is configured to display a confirmation field of the returning-to-port checklist; and
   at least one of a power source, a cabin, or a storage space of the marine vessel is locked in response to an input to the confirmation field.

3. The marine vessel management system according to claim 2, wherein
   the marine vessel includes a communication module configured to obtain the returning-to-port checklist including at least one of an amount of bilge remaining in a hull of the marine vessel, or presence/absence of abnormality in the power source of the marine vessel; and
   the communication module is configured to transmit the returning-to-port checklist to the information processor.

4. The marine vessel management system according to claim 3, wherein the returning-to-port checklist includes the contact with the marine vessel which includes at least one of a contact with the hull, a contact with a propeller of the marine vessel, or a contact with a rudder of the marine vessel.

5. The marine vessel management system according to claim 4, wherein in a case that there is the contact with the hull, the portable terminal device is configured to prompt to photograph the hull.

6. The marine vessel management system according to claim 5, wherein in a case that there is the contact with the hull and the hull is not photographed, the portable terminal device does not display the confirmation field of the returning-to-port checklist.

7. The marine vessel management system according to claim 4, wherein presence/absence of the contact with the hull is determined based on a history of a gravitational acceleration acting on the hull; and presence/absence of the contact with the propeller of the marine vessel is determined based on at least one of a history of a rotation number of an engine that is the power source or a history of an intake air amount of the engine.

8. The marine vessel management system according to claim 3, wherein in a case that there is the contact with the marine vessel, the portable terminal device is configured to display the returning-to-port checklist including a confirmation field for the marine vessel user and a confirmation field for a rental business operator of the marine vessel as the confirmation field.

9. The marine vessel management system according to claim 1, wherein the information processor is configured or programmed to store the information about the state of the marine vessel when the marine vessel is returning to the port.

10. The marine vessel management system according to claim 1, wherein the information processor is configured or programmed to calculate a rental fee based on a rental time of the marine vessel and the state of the marine vessel when the marine vessel is returning to the port, and the portable terminal device is configured to display the calculated rental fee; and in a case that a contact history of the marine vessel exists, the information processor is configured or programmed to calculate the rental fee further based on an estimate of repair costs for damage to a hull due to a contact of the marine vessel recorded in the contact history.

11. The marine vessel management system according to claim 1, wherein, when the marine vessel is leaving the port and at least one of a cabin or a storage space of the marine vessel is unlocked, the portable terminal device is configured to display the information about the state of the marine vessel as a leaving port checklist.

12. The marine vessel management system according to claim 11, wherein the portable terminal device is configured to display a confirmation field of the leaving port checklist; and a power source of the marine vessel is unlocked in response to an input to the confirmation field.

13. The marine vessel management system according to claim 11, wherein in a case that there is damage to a hull of the marine vessel, the portable terminal device is configured to display information about the damage along with the leaving port checklist.

14. A marine vessel management system comprising:

a marine vessel; and a portable terminal device configured to be operated by a marine vessel user who rents and pilots the marine vessel; wherein when the marine vessel is leaving a port upon completing a leaving port procedure and when the marine vessel is returning to the port upon completing a check instruction regarding a state of the marine vessel, the portable terminal device operated by the marine vessel user is configured to receive information about the state of the marine vessel from the marine vessel, and display the received information about the state of the marine vessel;

upon completing the leaving port procedure, the information processor is configured or programmed to unlock the marine vessel;

the portable terminal device is configured or programmed to determine a presence/absence of a contact of a foreign object with the marine vessel; and when the marine vessel is returning to the port, the information about the state of the marine vessel is displayed as a returning-to-port checklist, and the returning-to-port checklist includes at least the presence/absence of the contact of the foreign object with the marine vessel.

* * * * *